(12) United States Patent
Cam-Winget et al.

(10) Patent No.: US 12,537,845 B2
(45) Date of Patent: Jan. 27, 2026

(54) TECHNIQUES FOR RISK MANAGEMENT BASED ON SOFTWARE BILL OF MATERIALS

(71) Applicant: Cisco Technology, Inc., San Jose, CA (US)

(72) Inventors: Nancy Patricia Cam-Winget, Mountain View, CA (US); Robert Edgar Barton, Richmond (CA); Edward Albert Warnicke, Austin, TX (US); Flemming S Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 18/318,198

(22) Filed: May 16, 2023

(65) Prior Publication Data

US 2024/0388595 A1 Nov. 21, 2024

(51) Int. Cl.
*H04L 9/40* (2022.01)
(52) U.S. Cl.
CPC ........ *H04L 63/1433* (2013.01); *H04L 63/145* (2013.01)
(58) Field of Classification Search
CPC .................................................. H04L 63/1433
See application file for complete search history.

(56) References Cited

U.S. PATENT DOCUMENTS

| 2015/0236917 | A1 | 8/2015 | Anderson |
| 2020/0134196 | A1* | 4/2020 | Collins ................... G06F 21/51 |
| 2020/0201620 | A1 | 6/2020 | Beard |
| 2020/0296136 | A1 | 9/2020 | Liu |
| 2022/0083652 | A1* | 3/2022 | Ransford .............. G06F 21/552 |
| 2022/0150270 | A1* | 5/2022 | Klein .................. G06F 11/3457 |
| 2022/0166626 | A1* | 5/2022 | Madisetti .................. H04L 9/50 |
| 2022/0207140 | A1* | 6/2022 | Mooney, III .......... G06F 21/577 |
| 2023/0224317 | A1* | 7/2023 | Greene ............... H04L 63/1416 726/23 |
| 2023/0359992 | A1* | 11/2023 | Duggan ................ G06F 21/577 |
| 2023/0418949 | A1* | 12/2023 | Stocks .................... G06F 40/20 |
| 2024/0012884 | A1* | 1/2024 | Heim .................... G06F 21/121 |

* cited by examiner

*Primary Examiner* — Khang Do
(74) *Attorney, Agent, or Firm* — Lee & Hayes, P.C.

(57) ABSTRACT

Techniques are described herein for determining and mitigating a risk to an organization associated with a security threat. In embodiments, such techniques may be performed by an access control device and may comprise receiving information about a security threat, identifying one or more components that are susceptible to the security threat, determining, based on a software bill of materials, a number of software applications associated with the one or more components, determining, based on usage metrics stored in relation to the number of software applications in relation to an organization, a risk value associated with the organization, and providing the risk value to at least one second electronic device.

18 Claims, 11 Drawing Sheets

TECHNIQUES FOR RISK MANAGEMENT BASED ON SOFTWARE BILL OF MATERIALS

TECHNICAL FIELD

The present disclosure relates generally to risk detection and management surrounding threats and vulnerabilities detected in relation to software applications.

BACKGROUND

Modern software applications are built using a collection of pre-existing libraries, open-source code, and other reusable components, along with custom software code. However, these reusable components, which are often easily accessible by the public, can become susceptible to security threats. For example, malicious actors may review the code for the publicly available components and identify weaknesses of those components that can be exploited in malicious code.

With the emergence of technologies such as Infrastructure as a Service (IaaS) and Software as a Service (SaaS), the resulting virtualization of services has led to a dramatic shift in how and what applications are made available to an organization. This increased availability in software applications has resulted in a corresponding increase in the difficulty of assessing risks to an organization resulting from the use of those software applications. For example, when a threat or vulnerability is detected in relation to a particular piece of code, it may be difficult for an organization to determine how the organization is impacted by that threat.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
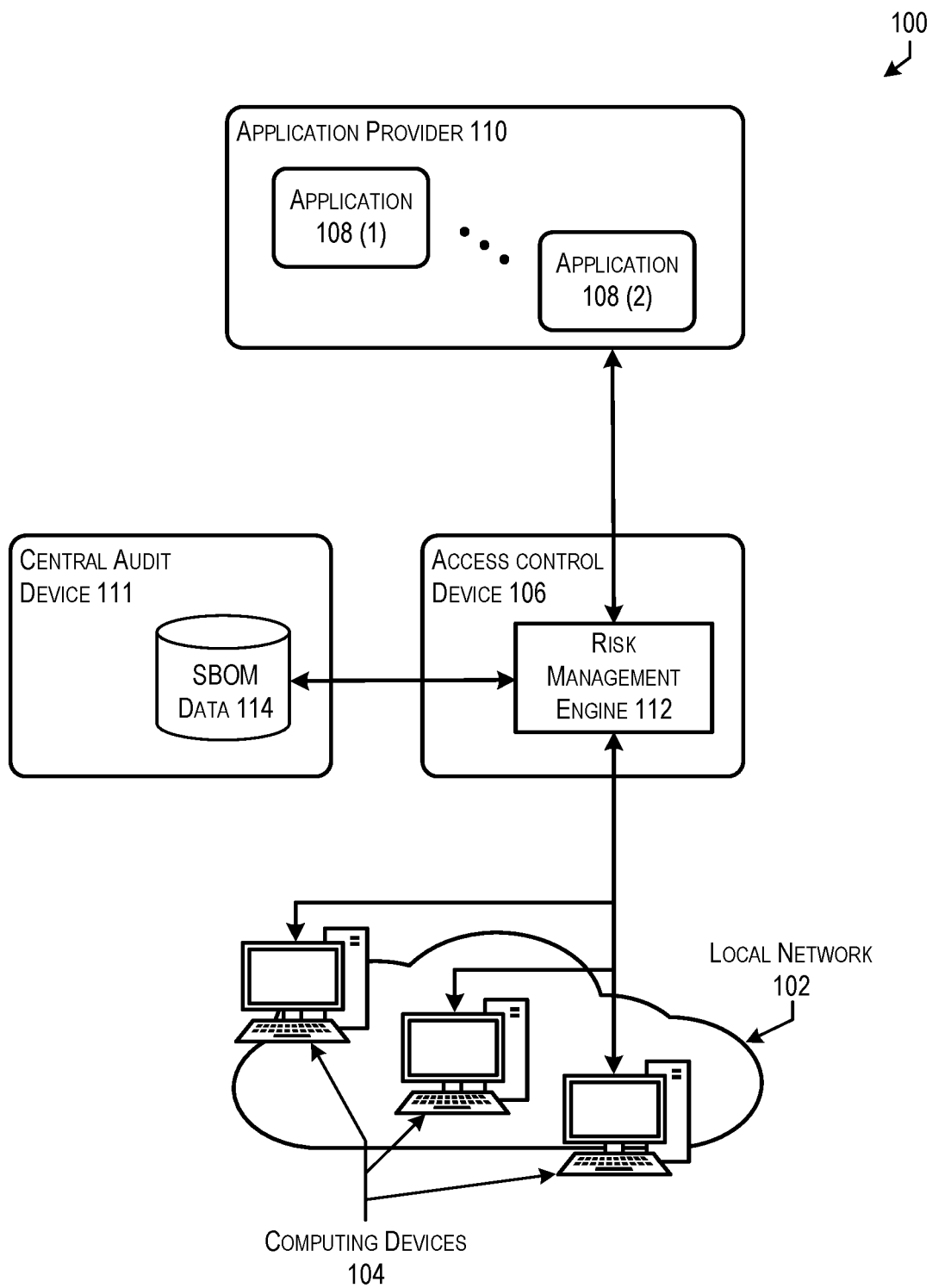
FIG. 1 depicts an example environment in which risks may be assessed in relation to detected vulnerabilities in accordance with at least some embodiments.

A first method according to the techniques described herein may first include receiving information about a security threat, identifying one or more components susceptible to the security threat. The method may further include determining, based on a software bill of materials (SBOM) a number of software applications associated with the one or more components, and determining, based on usage metrics stored in relation to the number of software applications in relation to an organization, a risk value associated with the organization. Once such a risk value has been determined, the method may further include providing the risk value to at least one second electronic device.

A second method according to the techniques described herein may first include receiving network traffic originating from a computing device associated with an organization. The method then includes determining a target software application associated with the network traffic, determining, based on a software bill of materials, a number of components associated with the target software application, identifying a number of current security threats associated with the number of components, and determining, based on the number of current security threats, a risk score associated with the network traffic. The method may further include determining, based on the risk score, whether to allow the network traffic.

Additionally, the techniques described herein may be performed by a system and/or device having non-transitory computer-readable media storing computer-executable instructions that, when executed by one or more processors, performs the method described above.

Example Embodiments

In order to combat the threat posed by software vulnerabilities, the recently signed US Executive Order on Cybersecurity drives a public Software Bill of Materials (SBOM) to secure the software supply chain. An SBOM, or SBOM data, may include any suitable indication of a set of components associated with a software application. SBOM provides a standards-based framework to expose the underlying software ingredients that have been used in a software application, or a microservice that is used as part of a software application.

This disclosure describes techniques that may be performed to determine and manage risks associated with software vulnerabilities. Such techniques are directed toward the use of a software bill of materials to determine a degree of exposure of an organization to a detected security threat. More particularly, upon detecting a security threat, a number of components (e.g., software components) may be identified as being vulnerable to that security threat. Embodiments of the disclosure may use a software bill of materials to identify a number of software applications that may be exposed to the security risk based on their association with the identified components. In these embodiments, a risk score can be calculated for each of the identified software applications that are then used to calculate a risk value to an organization based on usage metrics related to an extent to which each software application is used by the organization.

Embodiments of the disclosure provide for a number of advantages over conventional systems. For example, by implementing embodiments of the disclosure, an organization can quickly determine a risk of a threat to an organization as that threat is detected. For example, each time that a software virus or software exploit is detected, the organization can immediately be made aware of the actual impact of that detected threat to that organization. This can prevent the organization from taking actions that might be disproportionate and expensive.

Additionally, implementation of embodiments of the disclosure may result in what is effectively a firewall that manages communications between computing devices of an organization and a remotely-hosted application provider. In such embodiments, network traffic directed toward a software application may be blocked or otherwise mitigated upon determining that the software application is susceptible to a detected threat. In some cases, the network traffic may be blocked upon determining that a risk score calculated for that network traffic is greater than a threshold risk score.

FIG. 1 depicts an example environment in which risks may be assessed in relation to detected vulnerabilities in accordance with at least some embodiments. In the environment 100 of FIG. 1, a local area network (LAN) 102 may be accessed by a number of computing devices 104 at a geographic site. As depicted, the computing devices 104 may be in communication with an access control device 106 that manages access to one or more applications 108 (1-N) hosted by an application provider 110. In the environment 100, the access control device 106 may be one of multiple access control device in communication with a central audit device 111.

The computing devices 104 may be any suitable electronic devices used to access software applications (e.g., software applications hosted by the application provider 110). By way of non-limiting example, such computing devices 104 may include a conventional server computer, workstation, desktop computer, laptop, tablet, network appliance, e-reader, smartphone, or other computing device.

In some embodiments, the access control device 106 may be any computing device that monitors or manages access between the computing devices 104 and the application provider 110. In some cases, the access control device 106 is an edge device acting as a network gateway between two or more networks (e.g., a LAN and a SD-WAN fabric). An edge device may include any electronic device that provides an ingress/egress point for a network (e.g., LAN 102). The edge device 106 may act as a router for a client user device. An example of an edge device 106 may include a router, routing switch, integrated access device, multiplexer, or any other suitable device. The edge device 106 may include one or more processors and a memory that stores computer executable instructions for implementing at least a portion of the functionality described herein.

In embodiments in which the access control device 106 is in communication with the application provider 110 over a Software-defined wide area network (SD-WAN) the access control device may be implemented on a next generation firewall (NGFW), a secure web gateway (SWB), a web application firewall (WAF), a cloud access security broker (CASB), a security services edge (SSE), a software-defined networking (SDN) controller, or any other suitable electronic device. In general, an SDN controller may comprise one or more devices configured to provide a supervisory service, typically hosted in the cloud, to an SD-WAN fabric and/or one or more SD-WAN service points. For instance, an SDN controller may be responsible for monitoring the operations thereof, promulgating policies (e.g., security policies, etc.), installing or adjusting IPsec routes/tunnels between LAN 102 and remote destinations such as the application provider 110.

When a user of one of the computing devices 104 accesses an application 108 hosted on the application provider 110, the access control device 106 may examine both the source and the destination of the flow, with the source internet protocol (IP) address used to determine the identity of the computing device or user generating the flow. The access control device examines the destination address of the flow and determines which application 108 the user is attempting to access. In some embodiments, other techniques may be used to determine the requested application, such as packet inspection in either the HTTP packet or the TLS SNI packet originating from the computing device 104.

In some embodiments, the access control device 106 may include a risk management engine 112 that is configured to monitor network traffic between the one or more computing devices 104 and one or more application provider 110. This network traffic may be generated as the computing devices 104 are used to access software applications hosted on the application provider 110. In these embodiments, the access control device may maintain access to a record of what computing devices 104 are used to access which software applications and to what extent. In some cases, such a record is maintained on the access control device (e.g., locally). In some cases, such a record may be maintained at a computing device that is separate from the access device (e.g., remotely) such as the central audit device 111. Upon detecting a software vulnerability (e.g., as reported by a separate application), a determination may be made as to the various components included in each of the software applications accessed. In embodiments, Software Bill of Materials (SBOM) data 114 may be maintained for each software application (and potentially each version of that software application). The risk management engine 112 may then assess a risk associated with each software application in relation to the detected threat based on information about a vulnerability of each component included in the software application to that threat. Based on the monitored network traffic (e.g., and particularly the extent to which each software application was accessed) and based on the determined risk associated with each of the software applications, determine an overall risk to an organization that includes the computing devices 104.

In embodiments in which the access control device 106 uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java™, C, C # or C++, or any scripting language, such as Perl, Python or TCL, as well as combinations thereof. The server(s) may also include database servers, including without limitation those commercially available from Oracle™, Microsoft™, Sybase™, and IBM™.

In some embodiments, a central audit device 111 may be any suitable electronic device capable of managing information obtained from one or more access control device 106. In embodiments, the central audit device 111 may receive from the access control device 106, and record, information about which computing devices have accessed which software applications and to what extent. Such information may include date and/or timing of access of software applications. In some cases, the central audit device 111 may be configured to record information received from the SBOM data 114 at the time that the access is detected. For example, in addition to recording information about what computing devices have accessed which software applications are particular dates/times, the central audit device 111 may also record the SBOM component information that exists for the software application at the time that the access is requested/provided.

In some embodiments, the application provider 110 may be any computing device capable of hosting one or more software applications. In some embodiments, the application provider 110 may include one or more Software as a Service (Saas) providers hosting a number of software applications that can be accessed on demand.

It should be noted that the access control device 106 may be in communication with the application provider 110 via any suitable connection. For example, the access control device 106 may be in communication with the application provider 110 via a connection over the Internet. In another example, the access control device 106 may be in communication with the application provider 110 via a network tunnel created over a software-defined wide area network. SD-WANs represent the application of SDN principles to WAN connections, such as connections using cellular networks, the Internet, and Multiprotocol Label Switching (MPLS) networks.

Regardless of the specific connectivity configuration for a network implemented in the example environment, a variety of access technologies may be used (e.g., ADSL, 4G, 5G, etc.) in all cases, as well as various networking technologies (e.g., public Internet, MPLS (with or without strict SLA), etc.) to connect the LAN 102 to application provider 110. Other deployments scenarios are also possible, such as using Colo, accessing application provider 110 via Zscaler™ or Umbrella™ services, and the like.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
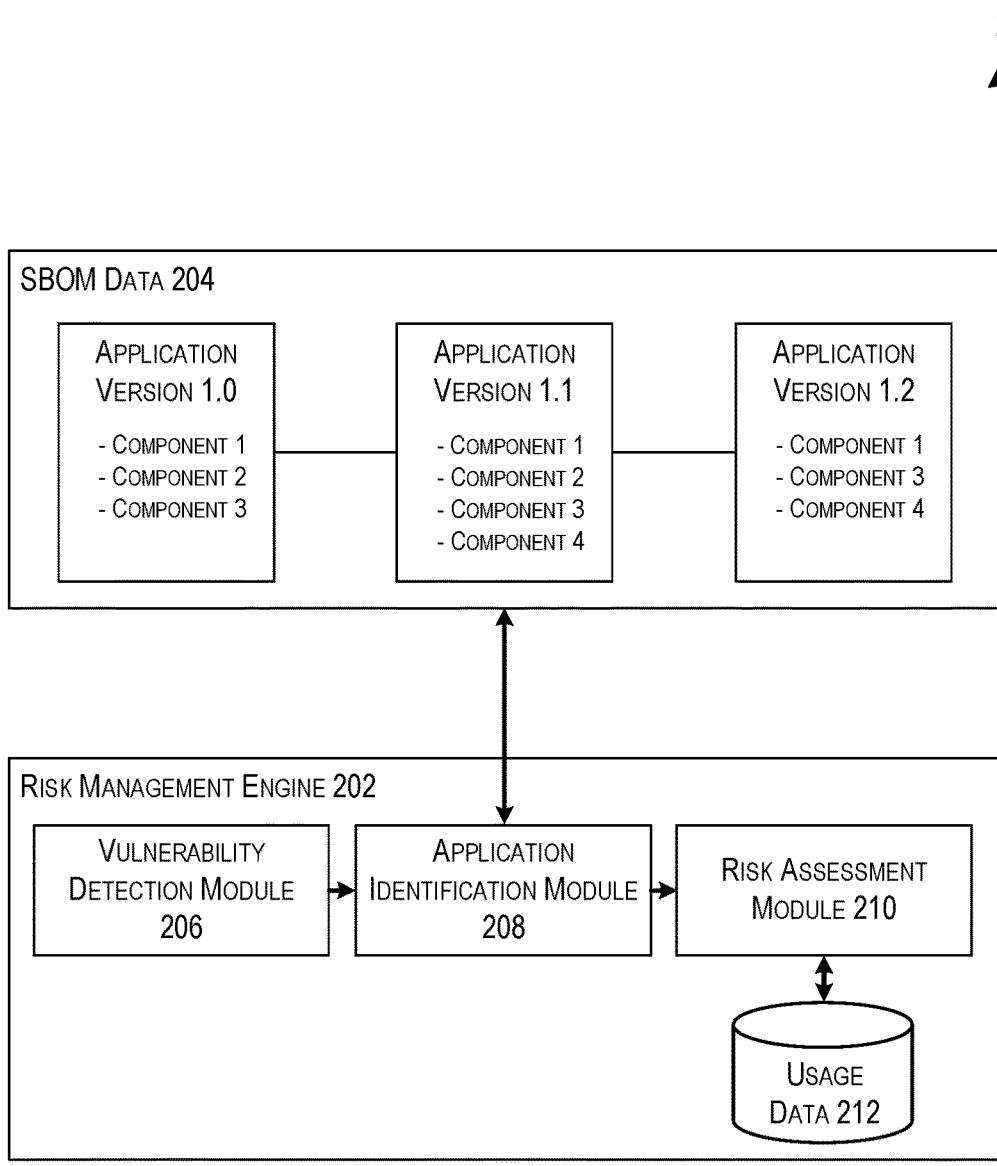
FIG. 2 depicts an example of a risk management engine that may be implemented to determine a level of risk associated with a detected software vulnerability in accordance with at least some embodiments.

FIG. 2 depicts an example of a risk management engine that may be implemented to determine a level of risk associated with a detected software vulnerability in accordance with at least some embodiments. As noted elsewhere, a risk management engine 202 may be implemented within an access control device. It should be noted that the risk management engine 202 may be an example of the risk management engine 112 as depicted in FIG. 1.

As noted elsewhere, the system may include SBOM data 204 that includes a record of what software components are included in a software application. In some embodiments, the SBOM data 204 may be included in a memory of the access control device (e.g., access control device 106 as depicted in FIG. 1). In other embodiments, the SBOM data may be included in a memory of the application provider (e.g., application provider 110 as depicted in FIG. 1).

In some cases, the SBOM data 204 may include an indication of various components that are included in a particular version of the software. In embodiments, the SBOM data 204 may include an immutable record. For example, the SBOM data 204 may be implemented as a blockchain ledger (e.g., Supply Chain Integrity, Transparency, and Trust (SCITT)) or an append-only database. It should be noted that the use of an immutable record in the system may prevent providers of software applications from hiding or otherwise misrepresenting a dependence of a software application on particular components that may be vulnerable to a threat. In some embodiments, the SBOM data may be arranged in a tree structure, indicating multiple layers of relationships between the various components. In some cases, the SBOM data may include an indication of a reference to a component that might be another software application for which additional SBOM data may be maintained.

In some cases, the SBOM data 204 may differentiate the record of components (e.g., artifacts) in a software application by version (e.g., software release version). By way of illustration, while each version of a software application may utilize a common set of components (e.g., libraries, open-source packages, repositories, etc.), the particular combination of components associated with the software application may be different for each version. By way of illustration, FIG. 2 depicts an exemplary SBOM data 204 for a software application. In this example, the SBOM data may include information about a first set of components 1-3 associated with version 1.0 of the software application, a second set of components 1-4 associated with version 1.1 of the software application, and a third set of components 1, 3, and 4 associated with version 1.2 of the software application.

In embodiments, the risk management engine 202 may include a number of modules configured to perform the functionality as described herein. For example, the risk management engine 202 may include a vulnerability detection module 206, an application identification module 208, and a risk assessment module 210. Additionally, the risk management engine 202 may have access to one or more data repositories, such as a database or other record that includes computing device usage data 212.

A vulnerability detection module 206, as described herein, may be configured to identify and detect new threats (i.e., vulnerabilities) that may impact software applications. In some embodiments, this may involve receiving an indication of a threat from a third-party vulnerability management application, such as Kenna or CyberVision. In embodiments, the indication of the threat may include information about what software components are impacted by the threat as well as what potential impact the threat might have on the component. Accordingly, the vulnerability detection module 206 may be configured to identify, for each detected threat, components that may be at risk in relation to that threat.

Once a threat has been identified, an application identification module 208 may be configured to identify each of the software applications that rely upon, or are otherwise associated with, the one or more of the components determined to be at risk of vulnerability from the detected threat. In various embodiments, the application identification module 208 is configured to locate references to a vulnerable component within the SBOM data 204 (e.g., within blocks of a blockchain ledger). Each time that such a reference is identified, a corresponding software application associated with that reference is determined. This process is repeated until each of the software applications associated with a component determined to be at risk of vulnerability has been determined.

Once a number of such software applications have been determined, the risk assessment module 210 may be configured to determine a risk associated with each of the software applications identified by the application identification module 208. In some cases, this may involve generating a score or other indication of risk that is a numeric representation of a likelihood that the software application can put a computing device that accesses that software application at risk. For example, the risk score might be a numeric representation of the likelihood that the software application could be exploited by an attacker based on its reliance upon the vulnerable component. In some embodiments, a magnitude of the risk score may be determined based on a severity of the detected threat.

As noted elsewhere, the system may include usage data 212 that indicates the extent to which each software application is used and by which computing devices 104. For example, an assessment may be made for a period of time (e.g., the last 30 days, etc.) in which various usage metrics may be calculated. For example, a determination may be made that in the last N number of days, 85% of Mac users have used open-source code X, 45% of Windows users have used component Y from a specific repository, and 99% of Rockwell PLC users have used open-source code Z. In another example, an assessment may be made that X % of computing device users are using stale applications (e.g., older versions of software applications) and Y % of computing device users are using unknown (or unauthorized) software applications. In yet another example, an assessment may be made as to what software applications have been accessed in the last N number of days and what the respective risk scores associated with those software applications are.

In embodiments, the risk management engine 202 may calculate a risk value that represents a risk to an organization based on risk scores calculated for each individual software application as well as information about which, and how often, software applications are used by each of the computing devices in the organization. In some cases, this risk might be calculated by using the usage data and individual risk scores as a function. For example, such a risk may be determined based on an average or a sum of risk scores for each software application used by the computing devices in the organization. In some embodiments, such a risk may be determined based on a severity of the threat and the extent to which software applications have been accessed by the computing devices that are vulnerable to the threat. In some embodiments, such a risk may be a percentage likelihood that the organization might be made vulnerable to a software exploit resulting from the threat.

In some embodiments, a risk value may be calculated for individual computing devices within the organization. For example, a risk may be determined for each computing device based on what software applications are typically accessed by that computing device as well as the risk scores determined for those software applications. In some cases, an identification may be made of the computing devices 104 that are most vulnerable to the threat. For example, in addition to determining a risk value for individual computing devices within the organization, a determination may be made as to a set of computing devices for which a calculated risk value above a threshold risk value.

Figure 3:
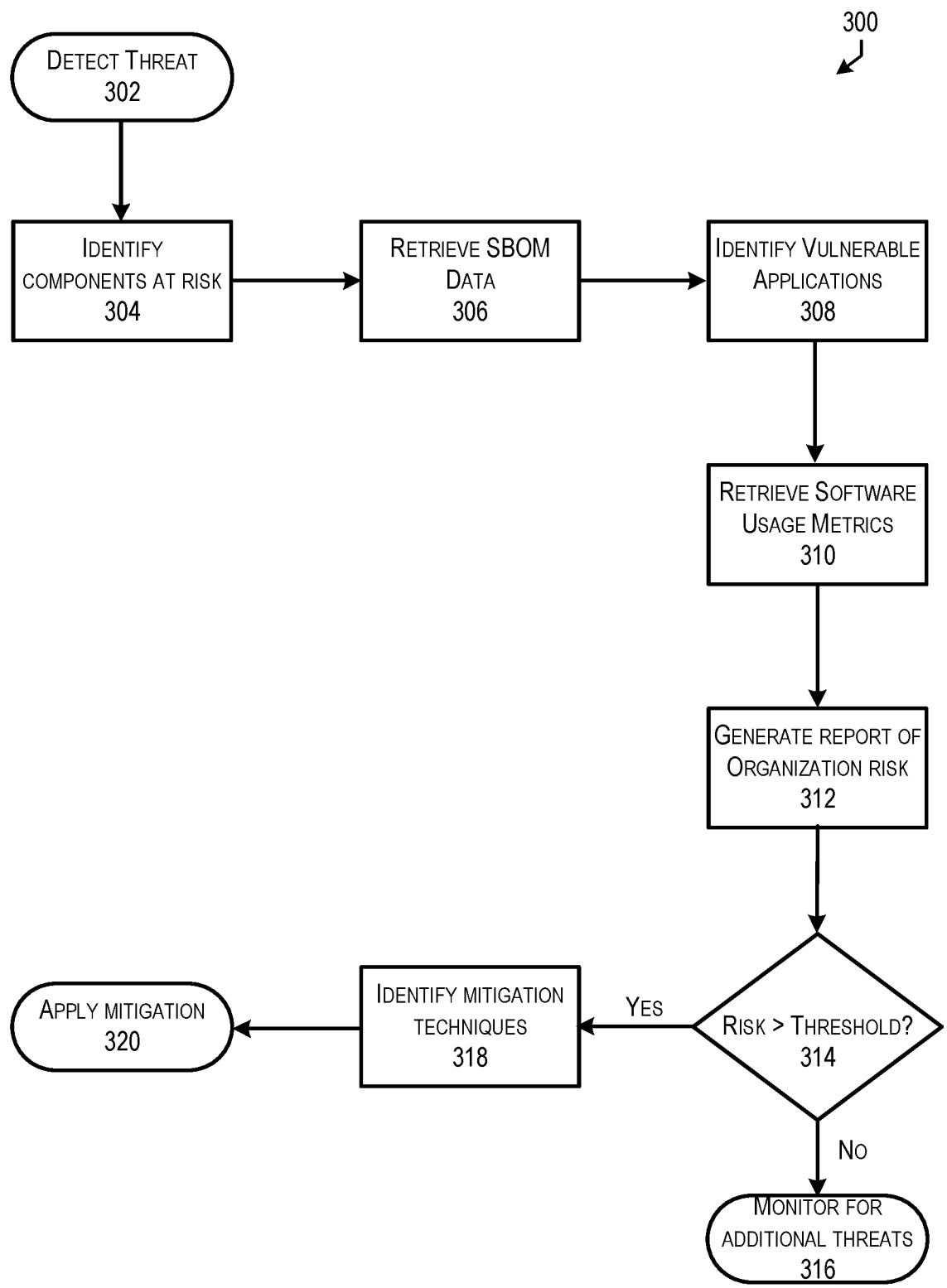
FIG. 3 depicts a block diagram illustrating an example of a process for generating and mitigating risk for an organization upon detecting a threat in accordance with at least some embodiments.

FIG. 3 depicts a block diagram illustrating an example of a process for generating and mitigating risk for an organization upon detecting a threat in accordance with at least some embodiments. The process 300 may be performed by an access control device, such as the access control device 106 as described in relation to FIG. 1 above.

At 302, the process 300 involves detecting a security threat, such as a software virus or software exploit. In embodiments, this may involve receiving information about a threat from a third-party vulnerability management application, such as Kenna or CyberVision. In embodiments, information may be received regarding a severity of the detected threat.

At 304, the process 300 involves identifying one or more software components that may be vulnerable to the detected threat. In embodiments, the indication of the threat received at 302 may include information about what software components are impacted by the threat as well as what potential impact the threat might have on the component.

At 306, the process 300 involves retrieving information about a number of software applications from a software bill of materials (SBOM) data. In embodiments, this may involve performing a query within the SBOM data to identify each of software applications that have an association with (e.g., a reliance upon) the components identified at 304. In some cases, this may further involve retrieving information about which particular versions of a software application have an association with the identified components. In some cases, information may be obtained about the relationship between the identified software applications and the respective components. For example, the relationship information may include an indication of what information is exchanged between the software application and the respective component. In another example, the relationship information may include an indication of a level of access or exposure of a component to a particular software application. A query of the SBOM data may be used to identify a set of software applications that are determined to be vulnerable to the threat detected at 302 based on their association with various components at 308.

At 310, the process 300 involves retrieving software usage metrics associated with an organization. As noted elsewhere, various monitoring techniques may be used to monitor information exchanged between computing devices of the organization and application providers that are hosted remotely. This monitoring of exchanged information can be used to generate a record of what applications are used by each of the computing devices of the organization and to what extent. Additionally, this usage metric data may further include information about components associated with a particular software application at the time that it was accessed. This record can then be used to determine a degree to which each of the software applications determined to be vulnerable to the detected threat are used (or otherwise accessed) by the computing devices of the organization.

In some embodiments, the usage metrics may be retrieved for a predetermined period of time. In one example, the usage metrics may be retrieved for the preceding 30 days. In this example, the usage metrics may include information about what software applications were accessed by which computing devices in the last 30 days as well as information about the various components associated with those software applications at the time that the access was made. It should be noted that, in this example, the components associated with the software applications may vary throughout the preceding 30 days. In some embodiments, upon detecting a threat or vulnerability, usage metrics may be retrieved for a period of time over which the detected threat or vulnerability is determined to have existed. In this example, a determination can be made of the organization's total risk to the detected threat or vulnerability.

In some embodiments, at 312, the process 300 may involve generating a report of the organization's risk of exposure to the detected threat. In these embodiments, the report may be used to identify a total risk to the organization as well as a risk associated with particular computing devices/users within the organization.

In some embodiments, the system may be further configured to perform one or more risk mitigation techniques in response to detecting the risk. In some cases, such techniques may be performed only if the determined risk to an organization is greater than a predetermined threshold risk value. Accordingly, the risk calculated for the organization at 312 may be compared against a threshold risk value at 314. In some cases, a threshold risk value may be specific to an organization. For example, separate risk value thresholds may be maintained for each of multiple organizations. In some cases, upon making a determination that the risk to an organization is not greater than the threshold risk value for an organization (e.g., "No" at 314), the process 300 may involve continuing to monitor for additional threats at 316.

Upon making a determination that the risk to an organization is greater than the threshold risk value for an organization (e.g., "Yes" at 314), the process 300 may involve identifying one or mitigation techniques at 318. In embodiments, such mitigation techniques may include techniques that may be used to mitigate the risk of the detected threat to the organization. Such techniques may include any suitable techniques for lowering risk or preventing detriments associated with those risks. For example, such techniques may involve patching of relevant computing devices (e.g., those that have accessed the vulnerable software applications), quarantining computing devices to prevent further lateral movement, or other suitable techniques. In some cases, the techniques may further include limiting access to one or more software applications or performing virus scanning on network traffic to or from the software application.

In some embodiments, an indication of at least one mitigation technique identified at 318 may be presented to a user (e.g., an administrator or other authorized user) to be implemented by the organization. In some embodiments, at least one mitigation technique identified at 318 may be implemented automatically by the access control device at 320 of the process 300. For example, an access control device may be configured to block, reduce, or otherwise minimize, access by one or more computing devices in the organization to a software application that has been identified at 308 as being vulnerable to the detected risk. In another example, an access control device may be configured to, upon receiving network traffic directed to or from an application determined to be vulnerable to the detected threat, reroute the network traffic through a virus scanner or other risk mitigation service.

Figure 4:
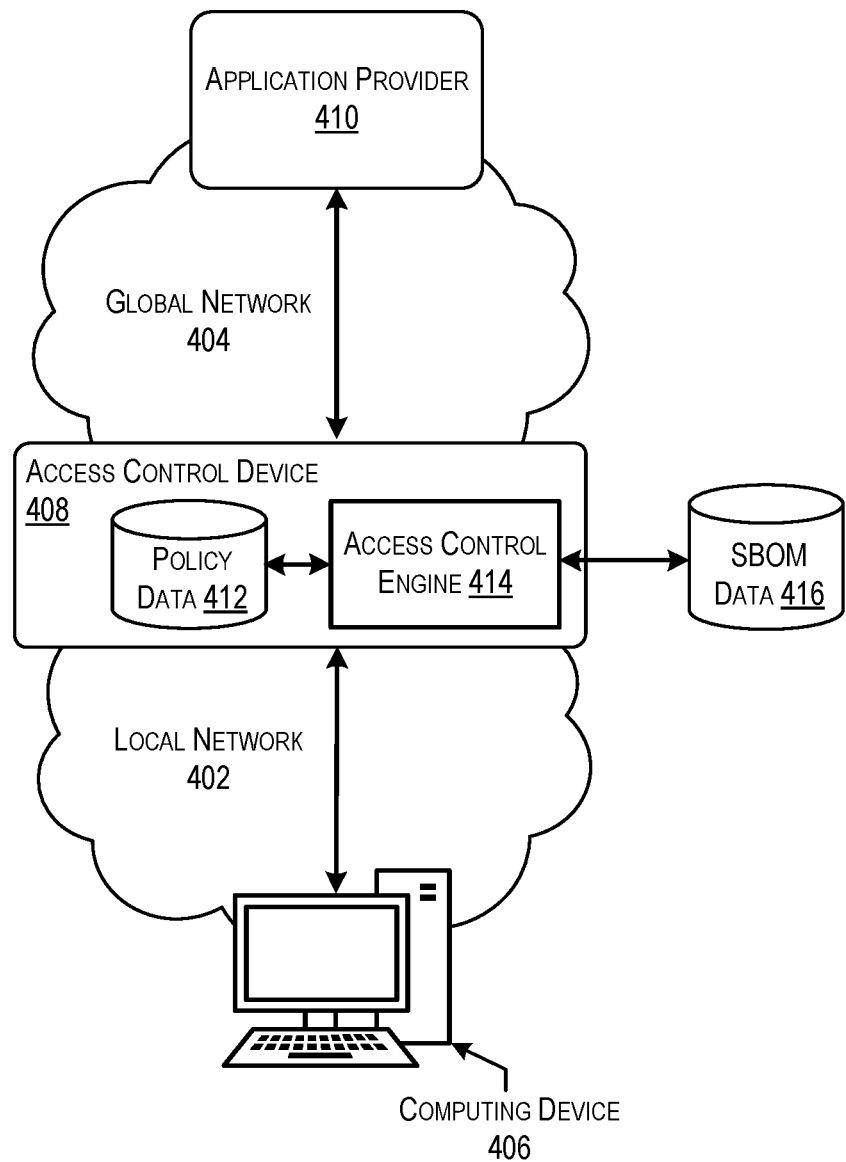
FIG. 4 depicts an example of access control device that may be used to control access to applications hosted on an application provider in accordance with at least some embodiments.

FIG. 4 depicts an example of access control device that may be used to control access to applications hosted on an application provider in accordance with at least some embodiments. As depicted, an organization may maintain a local network 402 which provides connectivity between a number of computing devices within the organization. The local network 402 may be in communication with a global network 404 (e.g., the Internet) via an access control device 406. In embodiments, the access control device 406 is implemented on an electronic device that provides ingress/egress between the local network 402 and the global network 404, such as a router or other edge device.

As noted elsewhere, the local network 402 may be maintained in relation to an organization, such as a business or other group. The local network 402 may include a number of computing devices 408 that are associated with that organization. In embodiments, a user of a computing device 408 may submit a request to access an application hosted by an application provider 410. For example, a user of the computing device 408 may request access to a Software as a Service (SaaS) application that is hosted on a remote server accessible over the global network 404.

Upon receiving the request to access the application, the access control device 406 may make a determination as to whether to allow the request to be forwarded to the application provider 410. In embodiments, this may involve determining whether a risk score associated with the request is in compliance with policy data 412 associated with the organization. In embodiments, the policy data 412 may be provisioned onto the access control device 408 by an administrator or other user associated with the organization that manages operations related to the local network 402.

Upon receiving a request to access an application hosted by an application provider 410, a risk may be calculated for that request by a access control engine 414. Note that the access control engine 414 may be an example of the risk management engine 112 described in relation to FIG. 1 above. In some embodiments, the access control engine 414 may be implemented on an access control device 408 as depicted in FIG. 4. In some embodiments, the access control engine 414 may be implemented on a remote server that can be accessed by the access control device 408 when a request is received.

To calculate a risk score for the request, the access control engine 414 may retrieve information about the various components associated with the software application to be accessed from SBOM data 416. In some cases, this may involve making an application programming interface (API) call to a computing device that is hosting the SBOM data 416. Additionally, the access control engine 414 retrieves information about current vulnerabilities and/or threats. In embodiments, information about vulnerabilities and/or threats may be retrieved from a third-party vulnerability management access control device. The access control engine 414 may then calculate a risk score for the request based on a vulnerability of each of the components associated with the software application in relation to the information retrieved about the current vulnerabilities and/or threats.

In embodiments, the policy data 412 may include an indication of a level of risk that is suitable to take on with respect to requests originating from the organization. In some cases, the policy data 412 may include an indication of a type of risk that the organization is willing to take on (e.g., potential exposure to software viruses, potential exposure to man-in-the-middle attack, etc.). In some embodiments, the policy data 412 may include an indication of a maximum/minimum risk score to be associated with requests to access applications. In these embodiments, the indicated risk score may be represented as a numeric value to be compared against the maximum/minimum risk score in order to determine if the request to access the application should be granted. In some embodiments, the level of risk that is suitable with respect to requests to access an application may vary based on a role associated with a user of the computing device 408 from which the request originated. For example, certain users may be permitted riskier access than others based on their role or credentials.

When implemented, the access control device 408 is configured to route communications between the computing devices 408 on the local network 402 and applications hosted by the application provider 410 over the global network 404. As noted, upon receiving a new request from a computing device 408 to access an application hosted by the application provider 410, the access control engine calculates a risk score associated with the request. If the risk score calculated for the request is below a threshold risk score value (as dictated by the policy data 412), then the access control device may be configured to forward the request to the application provider 410. If, on the other hand, the risk score calculated for the request is above the threshold risk score value (as dictated by the policy data 412), then the access control device may be configured to take an action such as to deny (or block) the request or contact an administrator or other user for permission to allow the request.

In some embodiments, the access control device 408 may be configured to maintain, or at least not exceed, a level of risk for the organization. For example, as noted elsewhere, the access control device 408 may determine a risk score for an organization in relation to a detected threat or vulnerability. In this example, if the risk score determined for the organization exceeds a threshold value, then the access control device may be configured to automatically reject access requests that are received in relation to an application that includes one or more components vulnerable to the detected threat.

Figure 5:
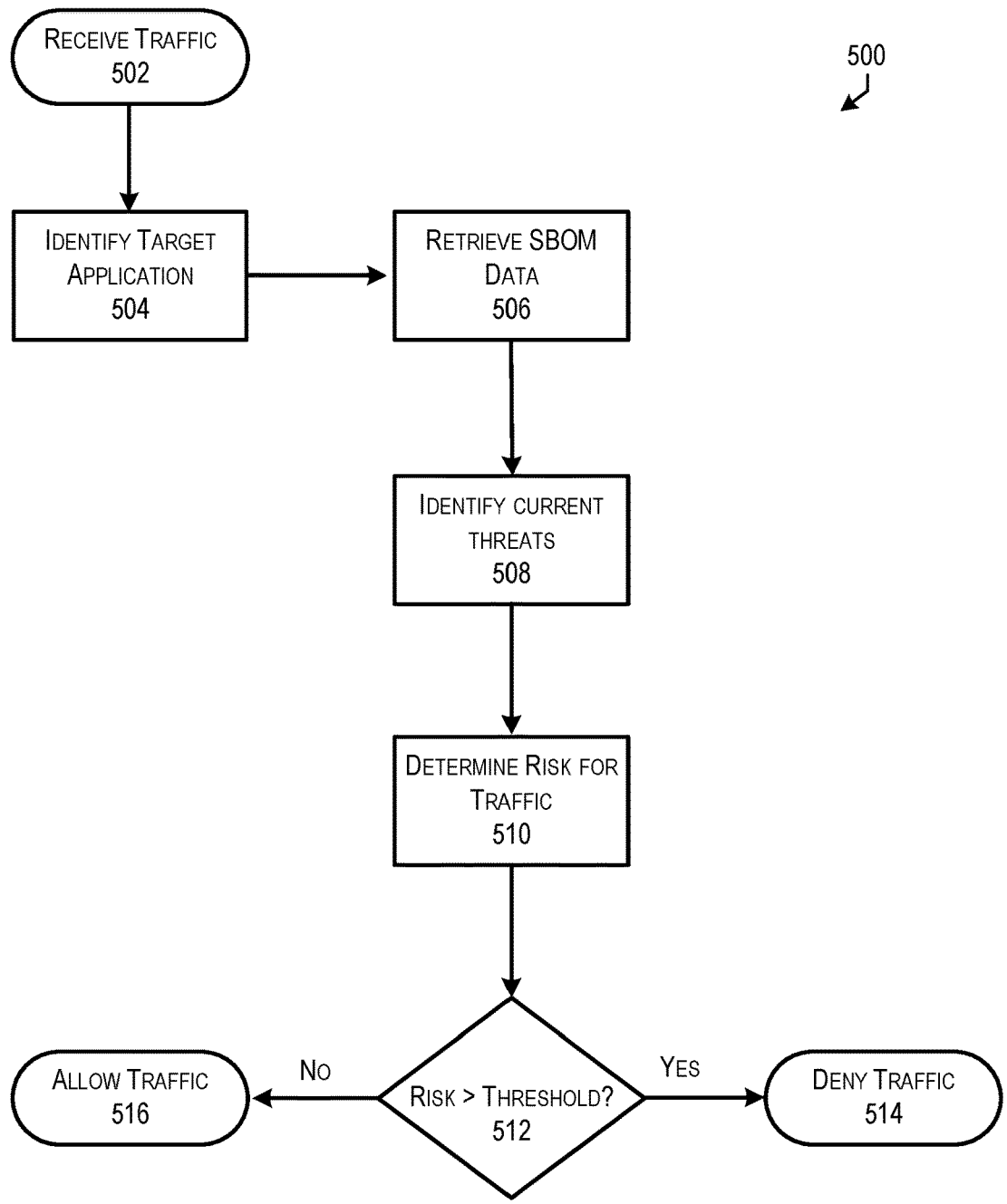
FIG. 5 depicts a block diagram illustrating an example of a process for allowing or denying network traffic based on a determined risk in accordance with at least some embodiments.

FIG. 5 depicts a block diagram illustrating an example of a process for allowing or denying network traffic based on a determined risk in accordance with at least some embodiments. The process 500 may be performed by an access control device acting as a network gateway, such as the access control device 408 as described in relation to FIG. 4 above.

At 502, the process 500 involves receiving network traffic from a computing device associated with an organization (e.g., a computing device on a local network). In this scenario, the network traffic may be a request to access an application hosted by an application provider.

At 504, the process 500 involves identifying a target software application to be accessed via the network traffic. In some embodiments, the target software application may be identified based on information included in the received network traffic. For example, the target software application may be identified using packet inspection in either the HTTP packet or the TLS SNI packet included in the received network traffic.

At 506, the process 500 involves retrieving information from a software bill of materials (SBOM) data related to the target software application. In these embodiments, the information retrieved from the SBOM data may include an indication of one or more components that is currently associated with the target software application. In some cases, such information may further include an indication of the relationship between the target software application and each of its components.

At 508, the process 500 involves identifying currently active security threats. In some embodiments, the access control device maintains a list of current security threats as well as a severity of each of those threats. For example, the access control device may receive an indication of a threat as it is detected by a third-party vulnerability management service. In this example, when the threat has been remediated (e.g., a software patch has been released to mitigate the threat), another indication may be received by the access control device, which may subsequently update the list of current threats to remove the respective threat from the list.

At 510, the process 500 involves determining a risk for the network traffic in relation to the target software application. This may involve calculating a risk score for the network traffic based on its exposure to the threat. For example, a risk score may be calculated as a function of any number of suitable factors, such as a severity of the detected threat, a type of exposure of one or more software components to the detected threat, and a type of the threat. Additionally, such a risk score may be calculated based on a type or amount of data included in the network traffic.

At 512, the process 500 involves determining whether the risk associated with the network traffic is greater than a predetermined threshold risk value. In some embodiments, the predetermined threshold risk value may be determined based on one or more policies stored in association with an organization. In some cases, both the calculated risk score and the threshold risk value may be numeric values that can be compared to determine if the risk associated with the network traffic is greater than the predetermined threshold risk value.

Upon making a determination that the risk associated with the network traffic is greater than the threshold risk value (e.g., "Yes" at 512), the process 500 may involve denying the network traffic to proceed at 514. Upon making a determination that the risk associated with the network traffic is not greater than the threshold risk value (e.g., "No" at 512), the process 500 may involve allowing the network traffic to proceed at 516. In some embodiments, this may involve routing the network traffic through a device that provides routing/protection of that network traffic, such as an internet service provider (ISP).

Figure 6:
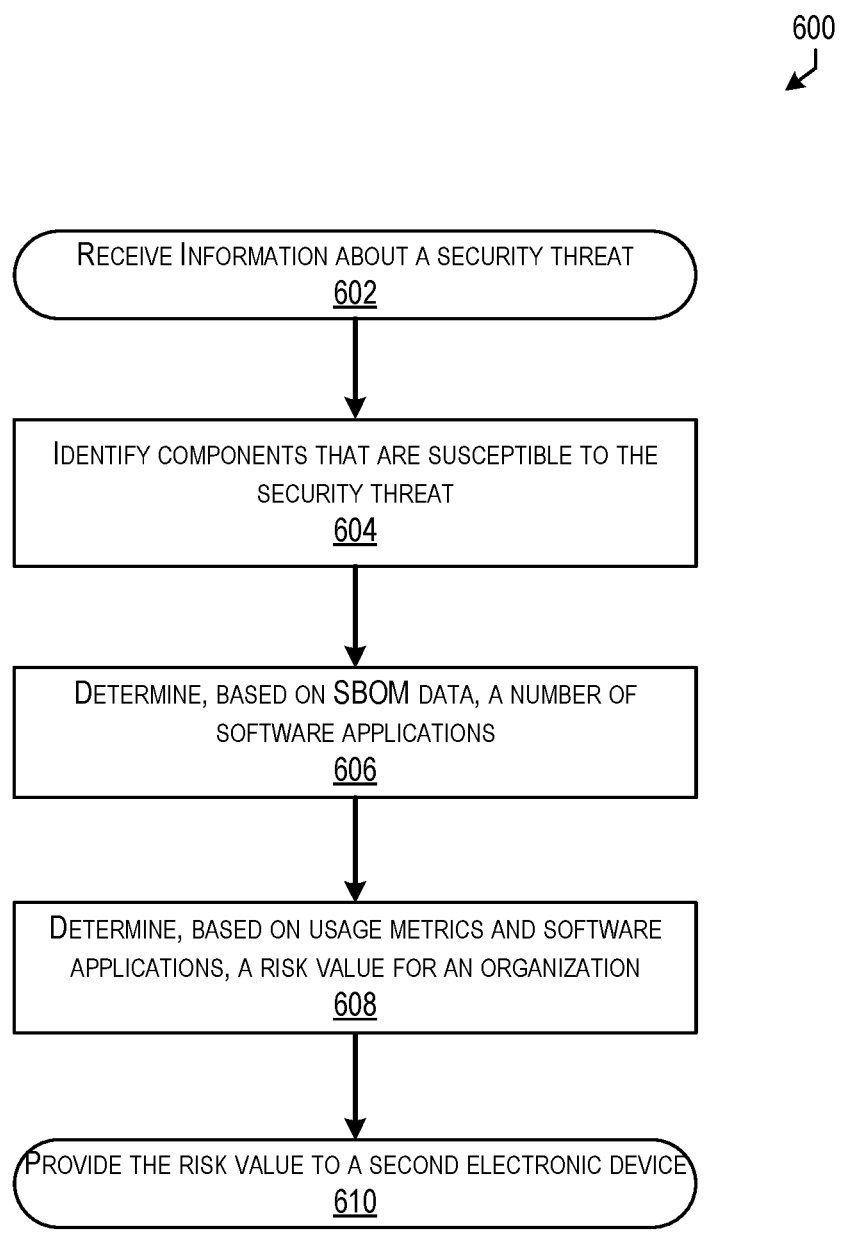
FIG. 6 depicts a flow diagram illustrating an exemplary process for detecting and mitigating a threat in accordance with at least some embodiments.

FIG. 6 depicts a flow diagram illustrating an exemplary process for detecting and mitigating a threat in accordance with at least some embodiments. While the process 600 is depicted as a series of blocks, it should be noted that the steps described in relation to process 600 may be performed in any suitable order. The process 600 may be performed by an access control device, such as the access control device 106 as described in relation to FIG. 1 above.

At 602, the process 600 may involve receiving information about a software security threat. In some embodiments, the information about the security threat is received from a third-party vulnerability management application. Such a security threat may include at least one of a software virus or software exploit.

At 604, the process 600 may involve identifying one or more software components that are susceptible to the software security threat. In some embodiments, the one or more components susceptible to the security threat may be identified based on information received from a third-party vulnerability management application. For example, when a third-party vulnerability management application (e.g., Kenna or CyberVision) provides information about a newly-detected security threat, that third-party vulnerability management application may also provide information about which software components may be susceptible to the detected security threat. In other embodiments, the one or more components susceptible to the security threat may be determined based on a function performed by the respective software component in relation to the security threat. For example, if a security threat pertains to an exploit made resulting from the use of a particular communication protocol, then a software component may be determined to be susceptible to the security threat is it uses that communication protocol.

At 606, the process 600 may involve determining, based on information stored in a software bill of materials (SBOM), a number of software applications associated with the one or more software components. In embodiments, the software bill of materials is on a computing device that is separate from the access control device. For example, the software bill of materials may be stored on a remote server. In another example, the software bill of materials may be stored as a distributed database or ledger across a number of geographically-distributed computing devices. In this example, the software bill of materials may be implemented as a blockchain ledger or other distributed form of data record. In some cases, a separate software bill of materials may be accessed in relation to each of the number of software applications.

At 608, the process 600 may involve determining, based on usage metrics for the organization as well as the number of software applications determined at 606, a risk value for the organization. In embodiments, the usage metrics may include information about a number of computing devices associated with the organization. More particularly, such usage metrics may include information about what software applications have been accessed by each of the number of computing devices and how often each software application of the number of software applications is accessed on the number of computing devices.

In some embodiments, the process 600 further involves calculating a risk score for each software application of the number of software applications based on a degree of susceptibility to the security threat of the one or more components. For example, a risk score may be calculated for each software application based on what threats the software application is vulnerable to (by virtue of the vulnerability of individual components relied upon by the software application) and a severity of the respective threats. In embodiments, a risk score may be calculated as a numeric value.

In embodiments, the risk value is determined as a function of a risk score for each of the number of software applications and information included in the usage metrics. For example, a degree to which each software application is used by computing devices of the organization may be used, along with a risk score calculated for each software application, to calculate the risk value to the organization. For example, if a risk score calculated for a software application's exposure to a particular threat is 100, and usage metrics indicate that 75% of an organization's computing devices use the applications for an average of 20% of their operation time, then a risk value of 15 (100×0.75×0.20) may be calculated for the organization. Note that this example has been simplified for the purposes of illustration. In some embodiments, a risk score (and the risk value by extension) is further determined based on a version associated with each of the number of software applications.

At 610, the process 600 may involve providing the risk value to at least one second electronic device. In some embodiments, the second electronic device comprises a user device associated with an administrator for the organization. For example, the second electronic device might be a mobile device or personal computing device that is registered to an administrator of the organization.

In some cases, the process 600 may further involve performing mitigation of the detected security threat. For example, the process may further involve identifying at least one mitigation technique associated with the security threat and implementing that mitigation technique. In at least some of these cases, the risk value calculated for the organization based on a detected threat may be compared against a threshold risk value. In some cases, one or more risk mitigation techniques may be implemented upon making a determination that the risk value calculated for the organization is greater than the threshold risk value.

By way of illustration, upon determining that a risk value for an organization is too great (e.g., greater than a predetermined threshold risk value), the access control device may be configured to deny (or otherwise prevent) communications between one or more computing devices of the organization and a software application determined to be vulnerable to the detected security threat (e.g., having a respective risk score greater than a risk score threshold), such as a software application hosted on an application provider (e.g., application provider 110 of FIG. 1).

Figure 7:
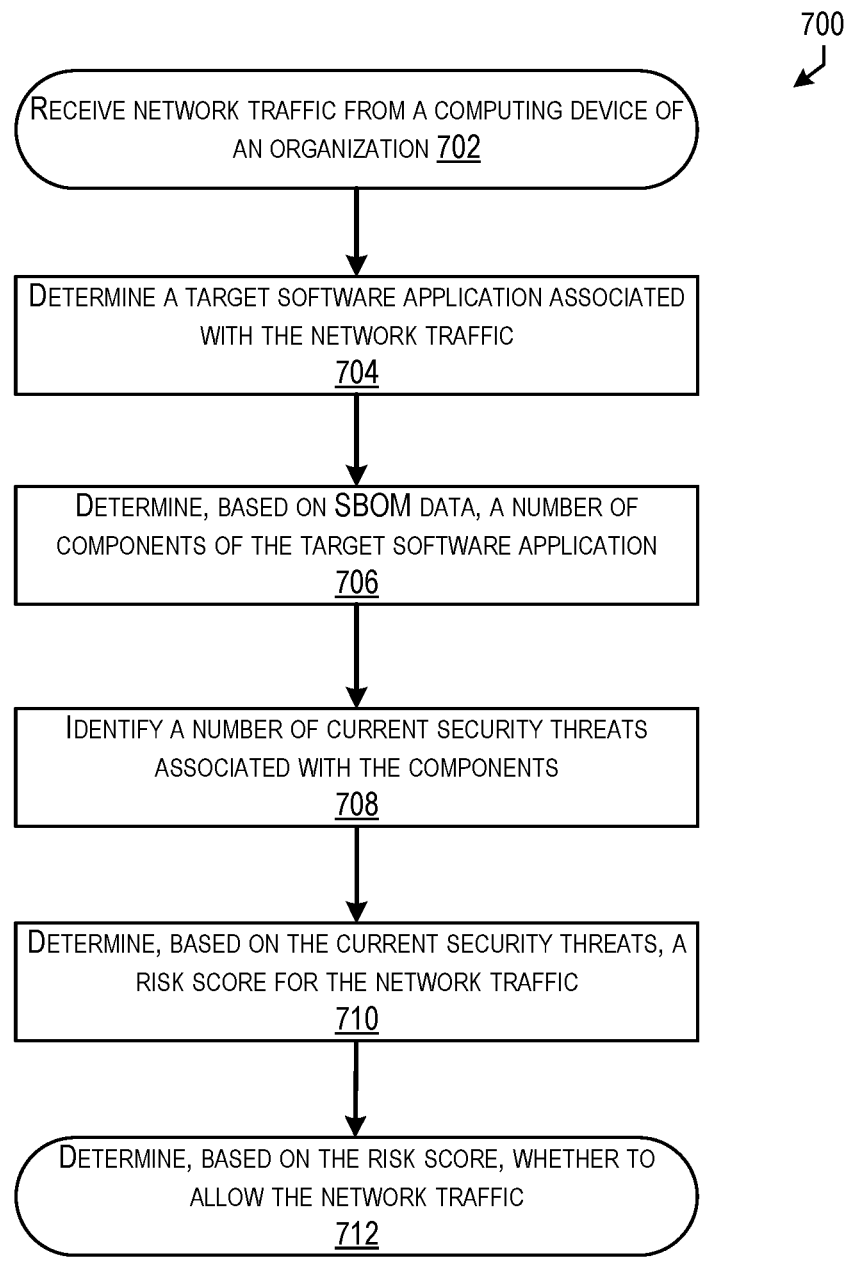
FIG. 7 depicts a flow diagram illustrating an exemplary process for managing network traffic based on detected threats in accordance with at least some embodiments.

FIG. 7 depicts a flow diagram illustrating an exemplary process for managing network traffic based on detected threats in accordance with at least some embodiments. The process 700 may be performed by an access control device acting as a network gateway, such as the access control device 408 as described in relation to FIG. 4 above.

At 702, the process 700 may involve receiving network traffic from a computing device associated with an organization. In some embodiments, the network traffic is received from a computing device in relation to a software application hosted on a remote computing device, such as a software application provider. For example, the network traffic may include a request to access a software application hosted on the remote computing device.

At 704, the process 700 may involve determining a target software application associated with the network traffic. In some embodiments, this may involve the use of one or more packet inspection techniques on the received network traffic to identify the intended target of the network traffic. In some cases, the intended target software application may be identified based on an address (e.g., an Internet protocol (IP) address) or other reference included in a portion (e.g., a header) of the network traffic. In some embodiments, this may involve making a determination of the target application based on information included in the network traffic. For example, a target application may be identified by virtue of being a software application that processes the type of data included within the network traffic.

At 706, the process 700 may involve determining, based on information in a software bill of materials, a number of components of the target software application. As noted elsewhere, a SBOM may be implemented as an immutable record. In some embodiments, the SBOM may be implemented as a blockchain ledger. In various embodiments, such a blockchain ledger may be a decentralized ledger in that it is distributed across a number of geographically separated computing devices.

At 708, the process 700 may involve identifying a number of current security threats associated with the number of components. Information about a number of current security threats may be received from a vulnerability management service as described elsewhere. In some embodiments, information about current security threats is stored in a database as that information is received. Such information may indicate details of the security threat, such as a severity, a type or category of security threat, and/or an indication of one or more components that are affected by the security threat.

At 710, the process 700 may involve determining, based on the current security threats, a risk score for the network traffic. This may further involve making a determination of which security threats are associated with the components of the software application. For example, a determination may be made as to which of the components associated with the target software application are also associated with at least one current security threat. The risk score may be calculated based on an indicated vulnerability of each of the identified components of the target application to the security threat. In some embodiments, the risk score may further be calculated based on a severity of the threat.

At 712, the process 700 may involve determining whether to allow or deny the network traffic based on the determined risk score. In some embodiments, this may involve assessing one or more policies associated with the organization to which the computing device belongs to ascertain an appropriate type or amount of risk that can be taken on. In some cases, such a policy may indicate a maximum risk score threshold, such that network traffic should only be allowed if it falls below that maximum risk score threshold.

Figure 8:
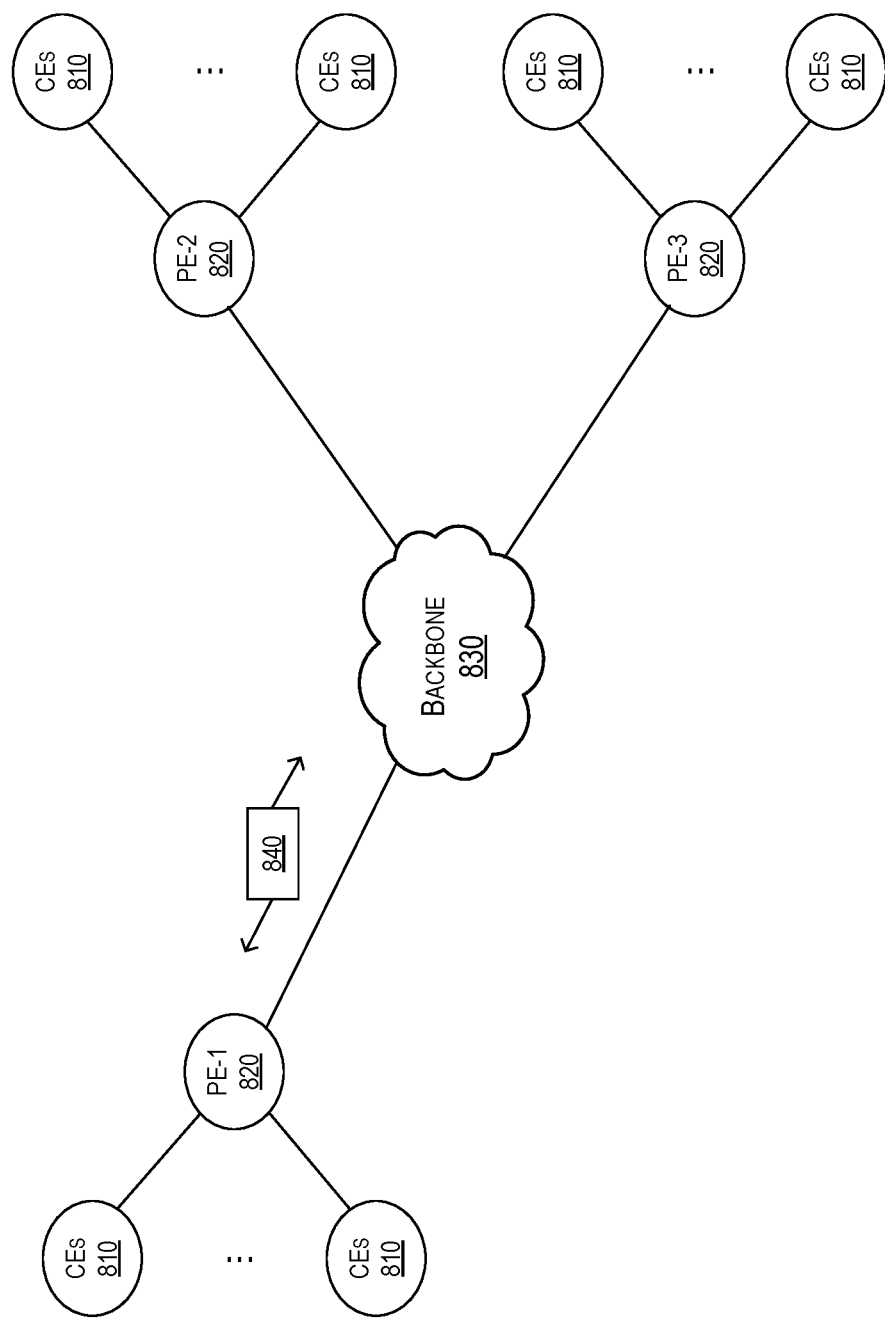
FIG. 8 is a schematic block diagram of an example computer network illustratively comprising nodes/devices, such as a plurality of routers/devices interconnected by links or networks, as shown.

FIG. 8 is a schematic block diagram of an example computer network 800 illustratively comprising nodes/devices, such as a plurality of routers/devices interconnected by links or networks, as shown. A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANS). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In the depicted example, customer edge (CE) routers 810 may be interconnected with provider edge (PE) routers 820 (e.g., PE-1, PE-2, and PE-3) in order to communicate across a core network, such as an illustrative network as backbone 830. For example, routers 810, 820 may be interconnected by the public Internet, a multiprotocol label switching (MPLS) virtual private network (VPN), or the like. Data packets 840 (e.g., traffic/messages) may be exchanged among the nodes/devices of the computer network 800 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 810 shown in network 800 may support a given customer site, potentially also with a backup link, such as a wireless connection.

2.) Site Type B: a site connected to the network by the CE router via two primary links (e.g., from different Access Control Devices), with potentially a backup link (e.g., a 3G/4G/5G/LTE connection). A site of type B may itself be of different types:

2a.) Site Type B1: a site connected to the network using two MPLS VPN links (e.g., from different Access Control Devices), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected is to network 800 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2, or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 810 connected to PE-2 and a second CE router 810 connected to PE-3.

Figure 9:
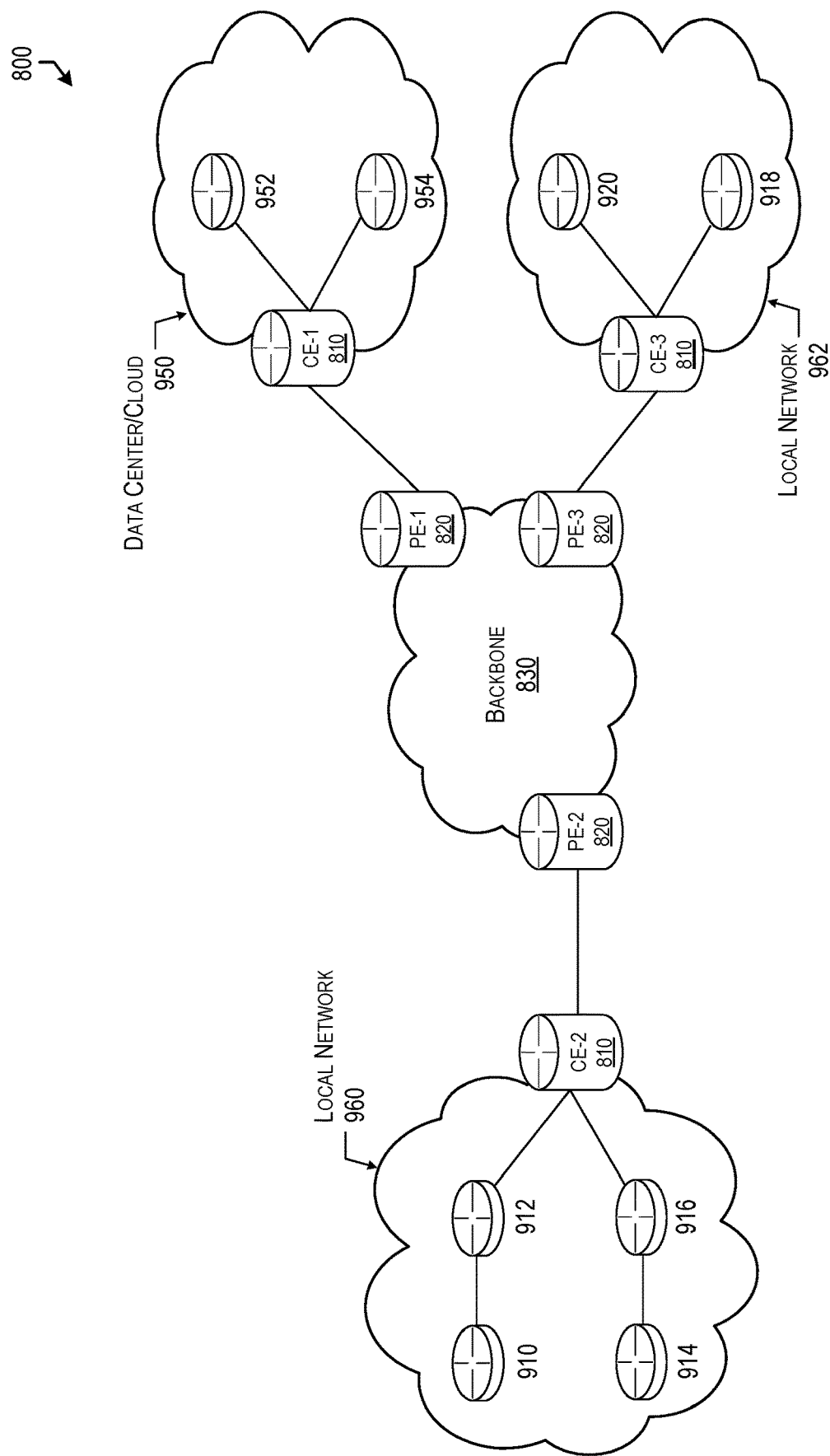
FIG. 9 illustrates an example of network in greater detail, according to various embodiments.

FIG. 9 illustrates an example of network 800 in greater detail, according to various embodiments. As shown, network backbone 830 may provide connectivity between devices located in different geographical areas and/or different types of local networks. For example, network 800 may comprise local/branch networks 960, 962 that include devices/nodes 910-916 and devices/nodes 918-920, respectively, as well as a data center/cloud environment 950 that includes servers 952-954. Notably, local networks 960-962 and data center/cloud environment 950 may be located in different geographic locations.

Servers 952-954 may include, in various embodiments, a network management server (NMS), a dynamic host configuration protocol (DHCP) server, a constrained application protocol (COAP) server, an outage management system (OMS), an application policy infrastructure controller (APIC), an application server, etc. As would be appreciated, network 800 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software defined WAN (SD-WAN) may be used in network 800 to connect local network 960, local network 962, and data center/cloud 950. In general, an SD-WAN uses a software defined networking (SDN)-based approach to instantiate tunnels on top of the physical network and control routing decisions, accordingly. For example, as noted above, one tunnel may connect router CE-2 at the edge of local network 960 to router CE-1 at the edge of data center/cloud 950 over an MPLS or Internet-based network in backbone 830. Similarly, a second tunnel may also connect these routers over a 4G/5G/LTE cellular service network. SD-WAN techniques allow the WAN functions to be virtualized, essentially forming a virtual connection between local network 960 and data center/cloud 950 on top of the various underlying connections. Another feature of SD-WAN is centralized management by a supervisory service that can monitor and adjust the various connections, as needed.

Figure 10:
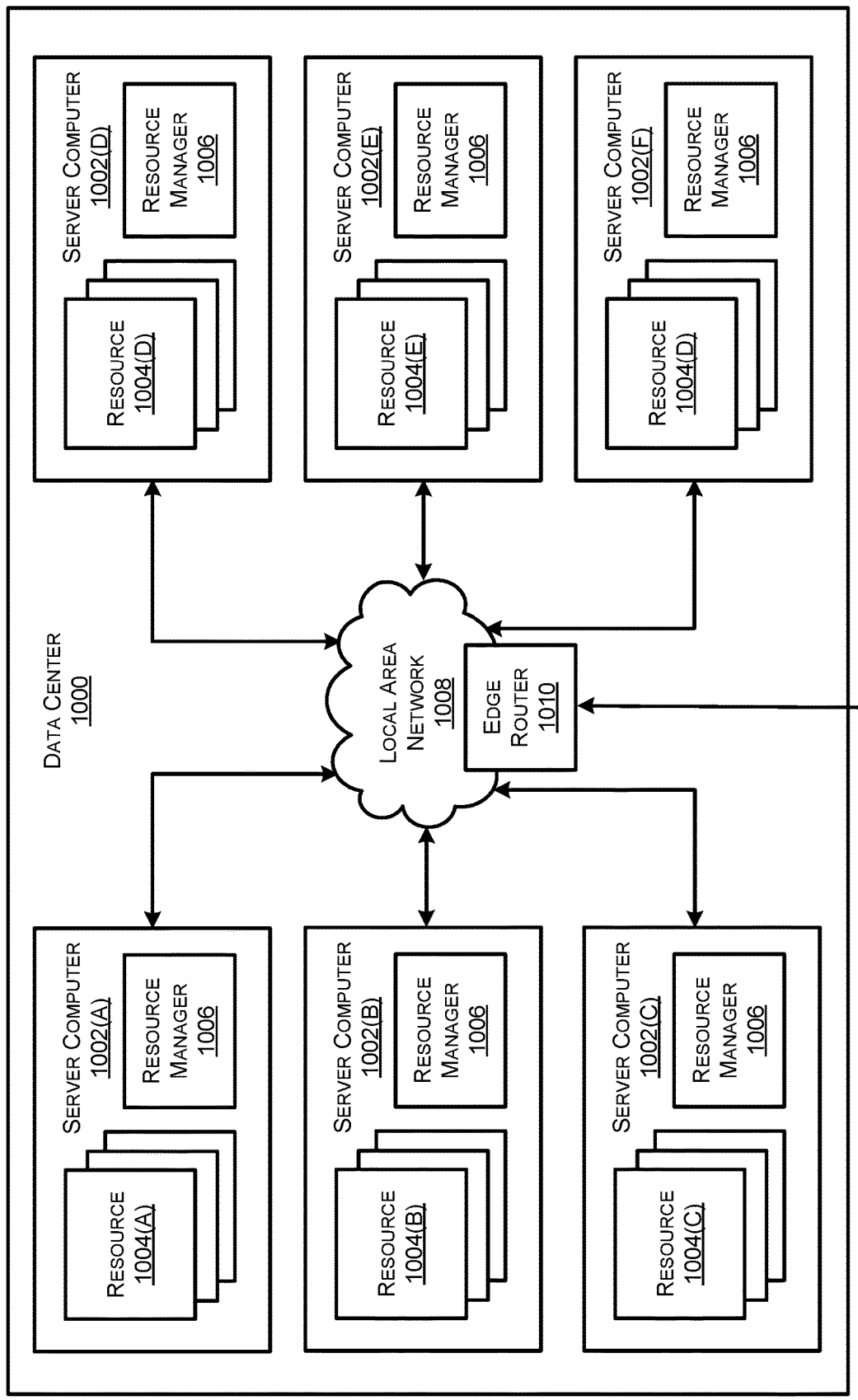
FIG. 10 is a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002A-1002F (which might be referred to herein singularly as "a server computer 1002" or in the plural as "the server computers 1002") for providing computing resources. In some examples, the resources and/or server computers 1002 may include, or correspond to, the any type of networked device described herein. Although described as servers, the server computers 1002 may comprise any type of networked device, such as servers, switches, routers, hubs, bridges, gateways, modems, repeaters, access points, etc.

The server computers 1002 can be standard tower, rackmount, or blade server computers configured appropriately for providing computing resources. In some examples, the server computers 1002 may provide computing resources 1004 including data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1000 can also be configured to provide network services and other types of services.

In the example data center 1000 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the server computers 1002A-1002F in each data center 1000, and, potentially, between computing resources in each of the server computers 1002. It should be appreciated that the configuration of the data center 1000 described with reference to FIG. 10 is merely illustrative and that other implementations can be utilized.

In some examples, the server computers 1002 may each execute one or more application containers and/or virtual machines to perform techniques described herein.

In some instances, the data center 1000 may provide computing resources, like application containers, VM instances, and storage, on a permanent or an as-needed basis. Among other types of functionality, the computing resources provided by a cloud computing network may be utilized to implement the various services and techniques described above. The computing resources 1004 provided by the cloud computing network can include various types of computing resources, such as data processing resources like application containers and VM instances, data storage resources, networking resources, data communication resources, network services, and the like.

Each type of computing resource 1004 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 1004 not mentioned specifically herein.

The computing resources 1004 provided by a cloud computing network may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations. One illustrative embodiment for a data center 1000 that can be utilized to implement the technologies disclosed herein will be described below with regard to FIG. 11.

Figure 11:
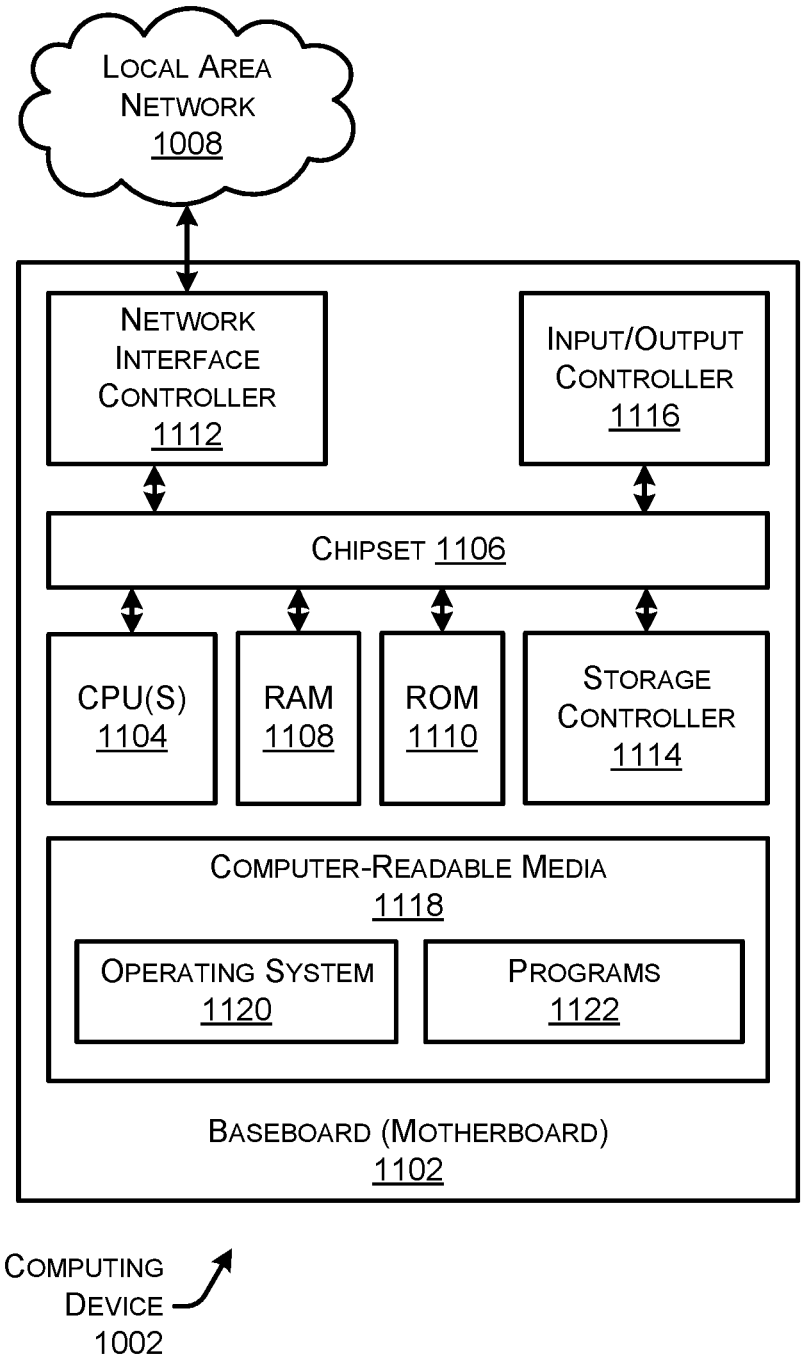
FIG. 11 shows an example computer architecture for a server computer capable of executing program components for implementing the functionality described above.

FIG. 11 shows an example computer architecture for a server computer 1002 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The server computer 1002 may, in some examples, correspond to a physical server as described herein, and may comprise networked devices such as servers, switches, routers, hubs, bridges, gateways, modems, repeaters, access points, etc.

The computer 1002 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1002.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1102. The chipset 1106 can further provide an interface to a computer-readable storage medium such as a read-only memory ("ROM") 1110 or non-volatile RAM ("NVRAM") for storing basic routines that help to startup the computer 1002 and to transfer information between the various components and devices. The ROM 1110 or NVRAM can also store other software components necessary for the operation of the computer 1002 in accordance with the configurations described herein.

The computer 1002 can operate in a networked environment using logical connections to remote computing devices and computer systems through a network, such as the network 1008. The chipset 1106 can include functionality for providing network connectivity through a NIC 1112, such as a gigabit Ethernet adapter. The NIC 1112 is capable of connecting the computer 1002 to other computing devices over the network 1008. It should be appreciated that multiple NICs 812 can be present in the computer 1002, connecting the computer to other types of networks and remote computer systems.

The computer 1002 can be connected to a storage device 1118 that provides non-volatile storage for the computer. The storage device 1118 can store an operating system 1120, programs 1122, and data, which have been described in greater detail herein. The storage device 1118 can be connected to the computer 1002 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1002 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computer 1002 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1002 can further read information from the storage device 1118 by detecting the physical states or characteristics of one or more particular locations within the physical storage units.

In addition to the mass storage device 1118 described above, the computer 1002 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1002. In some examples, the operations performed by devices as described herein may be supported by one or more devices similar to computer 1002. Stated otherwise, some or all of the operations performed by an edge device, and/or any components included therein, may be performed by one or more computer devices 1002 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computer 1002. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computer 1002.

In one embodiment, the storage device 1118 or other computer-readable storage media is encoded with computer-executable instructions which, when loaded into the computer 1002, transform the computer from a general-purpose computing system into a special-purpose computer capable of implementing the embodiments described herein. These computer-executable instructions transform the computer 1002 by specifying how the CPUs 1104 transition between states, as described above. According to one embodiment, the computer 1002 has access to computer-readable storage media storing computer-executable instructions which, when executed by the computer 1002, perform the various processes described above with regard to the other figures. The computer 1002 can also include computer-readable storage media having instructions stored thereupon for performing any of the other computer-implemented operations described herein.

The computer 1002 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1002 might not include all of the components shown in FIG. 11, can include other components that are not explicitly shown in FIG. 8, or might utilize an architecture completely different than that shown in FIG. 11.

As described herein, the computer 1002 may include one or more hardware processors 1104 (processors) configured to execute one or more stored instructions. The processor(s) 1104 may comprise one or more cores. Further, the computer 1002 may include one or more network interfaces configured to provide communications between the computer 1002 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 800. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 1122 may comprise any type of programs or processes to perform the techniques described in this disclosure. The programs 1122 may comprise any type of program that cause the computing device 1002 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below. PE Module may also include computer executable instructions that, when executed by processor(s), cause computing device 1002 to perform the techniques described herein. To do so, in some embodiments. PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments. PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANS (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receive, at an access control device, information about a security threat;
identify, by the access control device, one or more components susceptible to the security threat;
determine, by the access control device based on a software bill of materials, a number of software applications associated with the one or more components;
determine, by the access control device based on usage metrics stored in relation to the number of software applications in relation to an organization, a risk value associated with the organization;
provide, by the access control device, the risk value to at least one second electronic device;
identify, by the access control device, at least one mitigation technique associated with the security threat; and
cause, by the access control device, the at least one mitigation technique to be implemented upon determining that the risk value is greater than a predetermined threshold risk value.

2. The method of claim 1, wherein the usage metrics stored in relation to the number of software applications comprises information indicating components associated with individual software applications of the number of software applications at a time that the respective individual software application was accessed.

3. The method of claim 1, wherein the security threat comprises at least one of a software virus or software exploit.

4. The method of claim 1, further comprising accessing, by the access control device, the software bill of materials on a computing device that is separate from the access control device.

5. The method of claim 1, wherein the software bill of materials is accessed on at least one blockchain ledger stored in relation to the number of software applications.

6. The method of claim 1, wherein the usage metrics comprise information about a number of computing devices associated with the organization.

7. The method of claim 6, wherein the usage metrics stored in relation to the number of software applications comprise information about how often each software application of the number of software applications is accessed on the number of computing devices.

8. The method of claim 1, further comprising calculating, by the access control device, a risk score for each software application of the number of software applications based on a degree of susceptibility to the security threat of the one or more components.

9. The method of claim 8, wherein the risk value is determined as a function of a risk score for each of the number of software applications and information included in the usage metrics.

10. An access control device comprising:
one or more processors; and
one or more non-transitory computer-readable media storing computer-executable instructions that, when executed by the one or more processors, cause the access control device to perform operations comprising:
receiving information about a security threat;
identifying one or more components susceptible to the security threat;
determining, based on a software bill of materials (SBOM) a number of software applications associated with the one or more components;
determining, based on usage metrics stored in relation to the number of software applications in relation to an organization, a risk value associated with the organization;
providing the risk value to at least one second electronic device;
identifying at least one mitigation technique associated with the security threat; and
implementing the at least one mitigation technique upon determining that the risk value is greater than a predetermined threshold risk value.

11. The access control device of claim 10, wherein the risk value is further determined based on a version associated with each of the number of software applications.

12. The access control device of claim 10, wherein the at least one second electronic device comprises a user device associated with an administrator for the organization.

13. The access control device of claim 10, wherein the one or more components susceptible to the security threat is identified based on information received from a third-party vulnerability management application.

14. The access control device of claim 1, wherein the operations further comprise providing a notification that includes the at least one mitigation technique to the at least one second electronic device, and wherein the implementing the at least one mitigation technique is further performed upon receiving a response to the notification.

15. One or more non-transitory computer-readable media storing computer-executable instructions that, when executed by one or more processors, cause the one or more processors to perform operations comprising:
receiving information about a security threat;
identifying one or more components susceptible to the security threat;
determining, based on a software bill of materials (SBOM) a number of software applications associated with the one or more components;
determining, based on usage metrics stored in relation to the number of software applications in relation to an organization, a risk value associated with the organization;
providing the risk value to at least one second electronic device;
identifying at least one mitigation technique associated with the security threat; and
implementing the at least one mitigation technique upon determining that the risk value is greater than a predetermined threshold risk value.

16. The one or more non-transitory computer-readable media of claim 15, wherein the security threat comprises at least one of a software virus or software exploit.

17. The one or more non-transitory computer-readable media of claim 15, wherein the software bill of materials is accessed on at least one blockchain ledger stored in relation to the number of software applications.

18. The one or more non-transitory computer-readable media of claim 15, wherein the usage metrics comprise information about a number of computing devices associated with the organization.

* * * * *